United States Patent
Gohndrone et al.

(10) Patent No.: US 11,492,448 B2
(45) Date of Patent: Nov. 8, 2022

(54) METHOD FOR HYDROSILYLATION OF ALIPHATICALLY UNSATURATED ALKOXYSILANES AND HYDROGEN TERMINATED ORGANOSILOXANE OLIGOMERS TO PREPARE ALKOXYSILYL TERMINATED POLYMERS USEFUL FOR FUNCTIONALIZING POLYORGANOSILOXANES USING A COBALT CATALYST

(71) Applicant: Dow Silicones Corporation, Midland, MI (US)

(72) Inventors: John Gohndrone, Midland, MI (US); Matthew Olsen, Collegeville, PA (US); Xiaoyuan Zhou, Midland, MI (US); William Johnson, Midland, MI (US); Christine Marchand, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 460 days.

(21) Appl. No.: 16/617,703

(22) PCT Filed: Jun. 26, 2018

(86) PCT No.: PCT/US2018/039380
§ 371 (c)(1),
(2) Date: Nov. 27, 2019

(87) PCT Pub. No.: WO2019/005713
PCT Pub. Date: Jan. 3, 2019

(65) Prior Publication Data
US 2020/0231755 A1 Jul. 23, 2020

Related U.S. Application Data

(60) Provisional application No. 62/524,639, filed on Jun. 26, 2017.

(51) Int. Cl.
*C08G 77/08* (2006.01)
*C08G 77/04* (2006.01)
*C08G 77/18* (2006.01)

(52) U.S. Cl.
CPC ........... *C08G 77/08* (2013.01); *C08G 77/045* (2013.01); *C08G 77/18* (2013.01)

(58) Field of Classification Search
CPC ........ C08G 77/12; C08G 77/20; C08G 77/08; C08G 77/18; C08L 83/04; C08L 43/04; B01J 2531/845
See application file for complete search history.

(56) References Cited

U.S. PATENT DOCUMENTS

| | | |
|---|---|---|
| 3,159,601 A | 12/1964 | Ashby |
| 3,175,993 A | 3/1965 | Weyenberg et al. |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,722,675 A | 2/1988 | Albarda |
| 4,766,176 A | 8/1988 | Lee et al. |
| 4,784,879 A | 11/1988 | Lee et al. |
| 4,871,827 A | 10/1989 | Klosowski et al. |
| 5,017,654 A | 5/1991 | Togashi et al. |
| 5,026,890 A | 6/1991 | Webb et al. |
| 5,036,117 A | 7/1991 | Chung et al. |
| 5,175,325 A | 12/1992 | Brown et al. |
| 5,233,071 A | 8/1993 | Wilczek |

(Continued)

FOREIGN PATENT DOCUMENTS

| | | |
|---|---|---|
| EP | 0347895 | 12/1989 |
| JP | 2010095457 | 4/2010 |
| WO | 2015171881 | 11/2015 |

OTHER PUBLICATIONS

First Japanese Office Action (with English Translation) regarding Application No. 2019-568139, dated Apr. 4, 2022.

(Continued)

*Primary Examiner* — Kuo Liang Peng
(74) *Attorney, Agent, or Firm* — Catherine U. Brown

(57) ABSTRACT

A method for preparing a product includes combining starting materials including A) a siloxane oligomer having silicon bonded hydrogen atoms, B) an alkoxysilane having at least one aliphatically unsaturated group capable of undergoing hydrosilylation reaction and C) a cobalt catalyst. The method can be used to produce a compound of formula (I). This compound can be used in a hydrosilylation reaction with a vinyl-functional polyorganosiloxane. The resulting product includes an ethyltrimethoxysilyl functional polyorganosiloxane useful in condensation reaction curable sealant compositions.

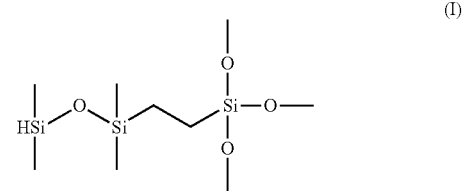

17 Claims, No Drawings

(56) References Cited

U.S. PATENT DOCUMENTS

| | | | |
|---|---|---|---|
| 5,276,123 | A | 1/1994 | King et al. |
| 5,403,881 | A | 4/1995 | Okawa et al. |
| 5,548,051 | A | 8/1996 | Michalczyk et al. |
| 5,840,794 | A | 11/1998 | Palmer |
| 5,983,593 | A | 11/1999 | Carbary et al. |
| 6,127,502 | A | 10/2000 | Krahnke et al. |
| 6,175,031 | B1 | 1/2001 | Tachikawa |
| 6,197,987 | B1 | 3/2001 | Jost et al. |
| 6,235,832 | B1 | 5/2001 | Deng et al. |
| 6,265,518 | B1 | 7/2001 | Krahnke et al. |
| 7,955,660 | B2 | 6/2011 | Rantala et al. |
| 8,513,469 | B2 | 8/2013 | Brammer |
| 9,156,948 | B2 | 10/2015 | Brandstadt et al. |
| 9,402,643 | B2 | 8/2016 | Auld et al. |
| 2007/0004928 | A1 | 1/2007 | Ramsden et al. |
| 2007/0037997 | A1 | 2/2007 | Uehara et al. |
| 2007/0290202 | A1* | 12/2007 | Matsumoto ........... C07F 7/1804 257/40 |
| 2008/0300358 | A1 | 12/2008 | Cook et al. |
| 2009/0291238 | A1 | 11/2009 | Scott et al. |
| 2016/0000251 | A1 | 1/2016 | Mosley et al. |

OTHER PUBLICATIONS

A. J. Chalk et al: Reactions between Dicobalt Octacarbonyl and Silicon Hydrides, Journal of The American Chemical Society, Mar. 1, 1965 (Mar. 1, 1965), pp. 1133-1135, vol. 87, No. 5.

Crivello, J.V.; Bi, Daoshen; "Regioselective Hydrosilations. IV. The Synthesis and Polymerization of Monomers Containing Epoxy and Alkoxysilane Groups." Department of Chemistry, Rensselaer Polytechnic Institute, p. 3121-3132, Troy, New York, 12180-3590.

Daisuke Noda el al: Non-Precious-Metal Catalytic Systems Involving Iron or Cobalt Carboxylates and Alkyl Isocyanides for Hydrosilylation of Alkenes with Hydrosiloxanes, Journal of The American Chemical Society, Mar. 2, 2016 (Mar. 2, 2016), pp. 2480-2483, vol. 138, No. 8.

Fritz, J., Wartusch., Dynasylan Silanes for the Silicone Industry. Evonik Industries, p. 1-32. Oct. 2016.

\* cited by examiner

METHOD FOR HYDROSILYLATION OF ALIPHATICALLY UNSATURATED ALKOXYSILANES AND HYDROGEN TERMINATED ORGANOSILOXANE OLIGOMERS TO PREPARE ALKOXYSILYL TERMINATED POLYMERS USEFUL FOR FUNCTIONALIZING POLYORGANOSILOXANES USING A COBALT CATALYST

CROSS REFERENCE TO RELATED APPLICATIONS

This application is a U.S. national stage filing under 35 U.S.C. § 371 of PCT Application No. PCT/US18/039380 filed on 26 Jun. 2018, currently pending, which claims the benefit of U.S. Provisional Patent Application No. 62/524,639 filed 27 Jun. 2017 under 35 U.S.C. § 119 (e). PCT Application No. PCT/US18/039380 and U.S. Provisional Patent Application No. 62/524,639 are hereby incorporated by reference.

BACKGROUND

In the reaction scheme shown below, hydrosilylation reaction of vinyltrimethoxysilane with 1,1,3,3-tetramethyldisiloxane using a platinum catalyst yields a mixture including the α-adduct branched isomer and β-adduct linear isomer as reaction products.

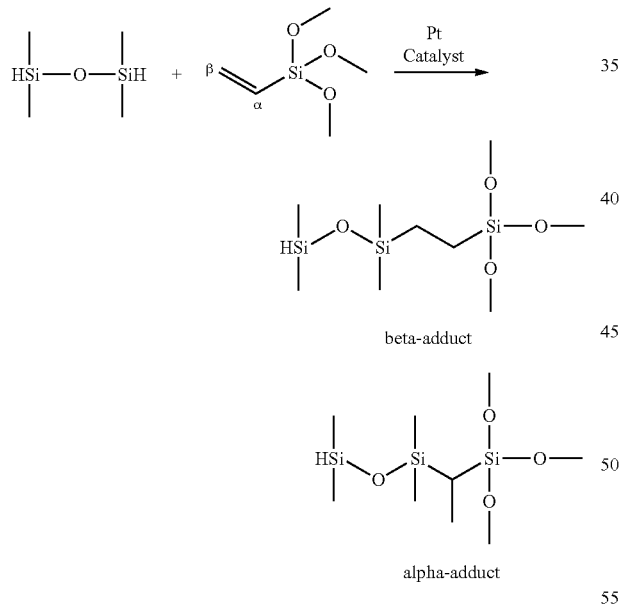

However, this method suffers from the drawback that selectivity results in a 65/35 mole ratio of β-adduct/α-adduct. In addition, without prompt removal or deactivation of the Pt catalyst, "over hydrosilylation" will occur, leading to side products in which both hydrogen atoms on the hydrogen terminated organosiloxane oligomer have reacted with a vinyltrimethoxysilane molecule, i.e., αα adduct, αβ adduct, βα adduct, and/or ββ adduct. One method for minimizing the formation of these side products is to use a molar excess of 1,1,3,3-tetramethyldisiloxane. However, this method suffers from the drawback of process inefficiency and the need to recover relatively large amounts of unreacted 1,1,3,3-tetramethyldisiloxane.

There is an industry need to provide one or more of the following benefits: 1) produce the beta-adduct with high selectivity and high yield; and 2) produce the beta-adduct stable in the presence of catalyst.

BRIEF SUMMARY OF THE INVENTION

A method for selectively preparing a product comprising an alkoxy-functional organohydrogensiloxane oligomer comprises:

1) reacting starting materials comprising:
    (A) a polyorganohydrogensiloxane oligomer of unit formula (I):
    $(HR^1_2SiO_{1/2})_e(R^1_3SiO_{1/2})_f$ $(HR^1SiO_{2/2})_g(R^1_2SiO_{2/2})_h$ $(R^1SiO_{3/2})_i(HSiO_{3/2})_j(SiO_{4/2})_k$ where subscripts e, f, g, h, i, j, and k have values such that $5 \geq e \geq 0$, $5 \geq f \geq 0$, $10 \geq g \geq 0$, $5 \geq h \geq 0$, subscript i is 0 or 1, $5 \geq j \geq 0$, subscript k is 0 or 1, with the proviso that a quantity $(e+g+j) \geq 2$, and a quantity $(e+f+g+h+i+j+k) \leq 50$; and each $R^1$ is independently a monovalent hydrocarbon group of 1 to 18 carbon or a monovalent halogenated hydrocarbon group of 1 to 18 carbon atoms;
    (B) an aliphatically unsaturated alkoxysilane of formula (II):

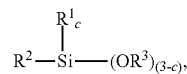

where $R^1$ is as described above, each $R^2$ is independently an aliphatically unsaturated monovalent hydrocarbon group of 2 to 18 carbon atoms, each $R^3$ is independently a monovalent hydrocarbon group of 1 to 18 carbon atoms, subscript c is 0 or 1; and
    (C) a cobalt complex, thereby preparing the reaction product comprising the alkoxy-functional organohydrogensiloxane oligomer; and optionally 2) isolating the alkoxy-functional organohydrogensiloxane oligomer prepared in step 1).

The alkoxy-functional organohydrogensiloxane oligomer has unit formula:

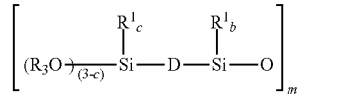

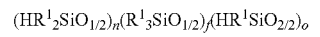
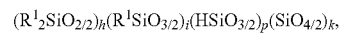

where
$R^1$, $R^3$, and subscripts c, f, h, i, and k are as described above, subscript b is 0 to 2, m>0, and a quantity (m+n+o+p)=(e+g+j), and each D is independently a divalent hydrocarbon group of 2 to 18 carbon atoms, with the proviso that >90 mol % of all D groups produced in step 1) are linear.

The alkoxy-functional organohydrogensiloxane oligomer is useful in a method for preparing a poly-alkoxy functional polyorganosiloxane. The method for preparing the poly-alkoxy functional polyorganosiloxane comprises:

(1) reacting starting materials comprising:
  (a) an alkoxy-functional organohydrogensiloxane oligomer described above,
  (b) a polyorganosiloxane having, per molecule, an average of at least two aliphatically unsaturated monovalent hydrocarbon groups; and
  (c) a hydrosilylation reaction catalyst.

DETAILED DESCRIPTION OF THE INVENTION

The method for selectively preparing a product comprising an alkoxy-functional organohydrogensiloxane oligomer comprises:
1) reacting starting materials comprising:
  (A) a polyorganohydrogensiloxane oligomer of unit formula (I):
  $(HR^1_2SiO_{1/2})_e(R^1_3SiO_{1/2})_f$ $(HR^1SiO_{2/2})_g(R^1_2SiO_{2/2})_h$ $(R^1SiO_{3/2})_i(HSiO_{3/2})_j(SiO_{4/2})_k$ where subscripts e, f, g, h, i, j, and k have values such that $5≥e≥0$, $5≥f≥0$, $10≥g≥0$, $5≥h≥0$, subscript i is 0 or 1, $5≥j≥0$, subscript k is 0 or 1, with the proviso that a quantity $(e+g+j)≥2$, and a quantity $(e+f+g+h+i+j+k)≤50$; and each $R^1$ is independently a monovalent hydrocarbon group of 1 to 18 carbon or a monovalent halogenated hydrocarbon group of 1 to 18 carbon atoms;
  (B) an aliphatically unsaturated alkoxysilane of formula (II):

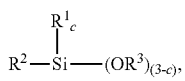

where each $R^2$ is independently an aliphatically unsaturated monovalent hydrocarbon group of 2 to 18 carbon atoms, each $R^3$ is independently a monovalent hydrocarbon group of 1 to 18 carbon atoms, subscript c is 0 or 1; and
  (C) a cobalt complex, thereby preparing the reaction product comprising the alkoxy-functional organohydrogensiloxane oligomer; and
optionally 2) isolating the alkoxy-functional organohydrogensiloxane oligomer prepared in step 1).

Ingredient (A) useful in the method described above is a polyorganohydrogensiloxane oligomer of unit formula (III):

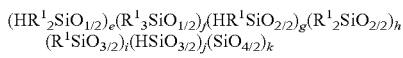

where subscripts e, f, g, h, i, j, and k have values such that $5≥e≥0$, $5≥f≥0$, $10≥g≥0$, $5≥h≥0$, subscript i is 0 or 1, $5≥j≥0$, subscript k is 0 or 1, with the proviso that a quantity $(e+g+j)≥2$, and a quantity $(e+f+g+h+i+j+k)≤50$; and each $R^1$ is independently a monovalent hydrocarbon group of 1 to 18 carbon or a monovalent halogenated hydrocarbon group of 1 to 18 carbon atoms. Alternatively, monovalent hydrocarbon groups for $R^1$ have 1 to 12 carbon atoms, and alternatively 1 to 10 carbon atoms.

Suitable monovalent hydrocarbon groups for $R^1$ include, but are not limited to, an alkyl group of 1 to 6 carbon atoms and an aryl group of 6 to 10 carbon atoms. Suitable alkyl groups for $R^1$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups for $R^1$ are exemplified by, but not limited to, phenyl, tolyl, xylyl, naphthyl, benzyl, and dimethyl phenyl. Suitable monovalent halogenated hydrocarbon groups for $R^1$ include, but are not limited to, a halogenated alkyl group of 1 to 6 carbon atoms, or a halogenated aryl group of 6 to 10 carbon atoms. Suitable halogenated alkyl groups for $R^1$ are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups for $R^1$ are exemplified by, but not limited to, the aryl groups described above where one or more hydrogen atoms is replaced with a halogen atom, such as F or Cl. For example, chlorobenzyl and fluorobenzyl are suitable halogenated aryl groups. Alternatively, each $R^1$ is independently methyl, ethyl or propyl. Each instance of $R^1$ may be the same or different. Alternatively, each $R^1$ is a methyl group. Examples of suitable hydridosilanes include trimethylsilane and trimethoxysilane.

In an alternative embodiment, ingredient (A) is an α,γ-hydrogen terminated organohydrogensiloxane oligomer of formula (IV):

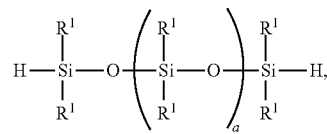

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is an integer up to 20. Alternatively, subscript a is 0 to 20, alternatively subscript a is 0 to 10; alternatively subscript a is 0 to 5; and alternatively subscript a is 0 or 1. Alternatively, subscript a may be 2 to 10; alternatively subscript a is 2 to 5. Examples of suitable organohydrogensiloxane oligomers include 1,1,3,3,5,5-hexamethyltrisiloxane, 1,1,3,3-tetramethyldisiloxane, 1,1,3,3,5,5-hexaethyltrisiloxane, and 1,1,3,3-tetraethyldisiloxane. Alternatively, ingredient (A) may be 1,1,3,3-tetramethyldisiloxane.

When the organohydrogensiloxane oligomer of formula (IV) is used in the method, the product comprises an alkoxy-functional organohydrogensiloxane oligomer Produced of formula (V):

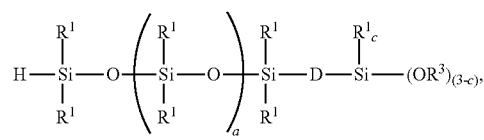

where $R^1$ and subscripts a and c are as described above, D is a divalent hydrocarbon group of 2 to 18 carbon atoms, with the proviso that >90 mol % of D are linear divalent hydrocarbon groups.

In an alternative embodiment, ingredient (A) the organohydrogensiloxane oligomer has unit formula (VI):

$(HR^1{}_2SiO_{1/2})_3(R^1{}_2SiO_{2/2})_q(R^1SiO_{3/2})$, where subscript q is 0 to 3. The polyorganohydrogensiloxane oligomer of this unit formula may have formula (VII):

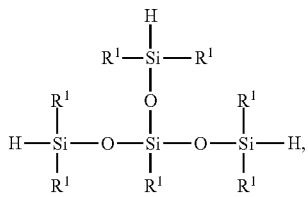

where $R^1$ is as described above. Examples of such organohydrogensiloxane oligomers include siloxanes of formula $(Me_2HSiO_{1/2})_3(PrSiO_{3/2})$, where Me represents a methyl group and Pr represents a propyl group.

When the organohydrogensiloxane oligomer used for ingredient A) in the method described above has unit formula (VI) or (VII), the product may comprise an alkoxy-functional organohydrogensiloxane oligomer of formula (VIII), where formula (VIII) is:

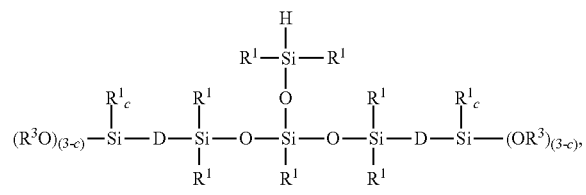

where $R^1$ and subscript c are as described above, each D is independently a divalent hydrocarbon group of 2 to 18 carbon atoms, with the proviso that >90 mol % of D are linear divalent hydrocarbon groups.

In an alternative embodiment of the invention, ingredient (A) the organohydrogensiloxane oligomer may have unit formula (IX):
$(HR^1{}_2SO_{1/2})_2(R^1{}_2SiO_{2/2})_q(HR^1SiO_{2/2})_r$, where $R^1$ is as described above, subscript q is 0 to 3, and subscript r is 0 to 3. In this embodiment, the organohydrogensiloxane oligomer may have formula (X):

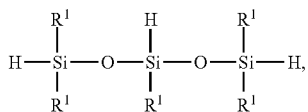

where $R^1$ is as described above. Examples of such organohydrogensiloxane oligomers include 1,1,3,5,5-pentamethyltrisiloxane. In this embodiment, the product comprises an alkoxy-functional organohydrogensiloxane oligomer of formula (XI), formula (XII), or a combination thereof, where formula (XI) is

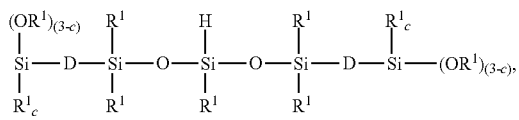

and formula (XII) is

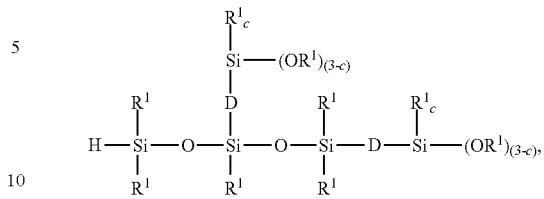

where $R^1$ and subscript c are as described above.

In an alternative embodiment ingredient (A) the organohydrogensiloxane oligomer is cyclic. The cyclic organohydrogensiloxane oligomer may have unit formula (XIII): $(R^1{}_2SiO_{2/2})_v(R^1HSiO_{2/2})_s$, where $R^1$ is as described above, subscripts 3, and subscript $v \geq 0$. Alternatively, subscript s may be 3 to 14; alternatively 3 to 9, alternatively 3 to 6, alternatively 3 to 5, and alternatively 4. Alternatively, subscript v may be 0 to 14; alternatively 0 to 9, alternatively 0 to 6, alternatively 0 to 5, and alternatively 0. When this cyclic organohydrogensiloxane oligomer is used as ingredient (A), then the product may comprise an alkoxy-functional organohydrogensiloxane oligomer of unit formula (XIV):

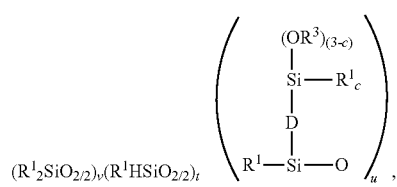

where R, $R^1$, D, and subscripts c and v are as described above, subscript t is 0 or more, subscript u is 1 or more, and a quantity (t+u)=s.

Ingredient (B) useful in the method described above is an aliphatically unsaturated alkoxysilane of formula (XV): $R^1{}_dR^2Si(OR^3)_{(3-d)}$, where each $R^1$ is independently a monovalent hydrocarbon group or a monovalent halogenated hydrocarbon group (as described above), each $R^2$ is independently an aliphatically unsaturated hydrocarbon group, each $R^3$ is independently a monovalent hydrocarbon group, subscript d is an integer from 0 to 1. The aliphatically unsaturated hydrocarbon group for $R^2$ may be an alkenyl group or an alkynyl group. Suitable alkenyl groups include vinyl, allyl, propenyl, butenyl and hexenyl; alternatively vinyl, allyl or hexenyl; and alternatively vinyl. The monovalent hydrocarbon group for $R^3$ may be a monovalent hydrocarbon group as described above for $R^1$.

Ingredient (B) may comprise an aliphatically unsaturated alkoxysilane exemplified by a dialkoxysilane, such as a dialkenyldialkoxysilane; a trialkoxysilane, such as an alkenyltrialkoxysilane; or a combination thereof. Examples of suitable aliphatically unsaturated alkoxysilanes include vinyltrimethoxysilane, allyltriethoxysilane, allyltrimethoxysilane, vinyltriethoxysilane, hexenyltrimethoxysilane, vinylmethyldimethoxysilane, hexenylmethyldimethoxysilane, hexenyltriethoxysilane, and a combination thereof, and alternatively vinyltrimethoxysilane.

Ingredient (A) and ingredient (B) are present in relative molar amounts of ingredient (A):ingredient (B) of 1:1 to >1:1, alternatively greater than or equal to 1, i.e., (A):(B) ratio 1:1. Alternatively, (A):(B) ratio may range from 5:1 to 1:1, alternatively 2:1 to 1:1; and alternatively 1.5:1 to 1:1. Without wishing to be bound by theory, it is thought that a molar excess of ingredient (A) relative to ingredient (B) may favorably affect yield in the product.

Ingredient (C) useful in the method and composition described herein is a cobalt complex. The cobalt complex has formula (XVI): $[Co(R^5)_x(R^6)_y(R^7)_w]_z$, where a quantity $(w+x+y)=4$ and subscript z is 1 to 6. Each $R^5$ is a ligand selected from carbon monoxide (CO), an isonitrile ($CNR^8$), a cyanoalkyl ($NCR^8$), $NO^+$ (called a nitrosyl or nitrosonium) or cyano ($CN^-$), where each $R^8$ is independently an alkyl group of 1 to 18 carbon atoms. The positively charged nitrosyl ligand for $R^5$ renders the catalyst positively charged. When $R^5$ is positively charged, a negatively charged counteranion will be present, such as a halogen atom (e.g., Cl or Br), tetrafluoroborate, hexafluorophosphate, or triflate. The negatively charged cyano ligand renders the catalyst negatively charged. When $R^5$ is negatively charged, a positively charged counter cation is present, such as sodium, potassium, tetrabutylammonium, or bis(triphenylphosphane iminium. Each $R^6$ is independently a phosphine ligand exemplified by a diphenyl-bisphosphino alkane ligand, such as diphenylbisphosphinoethane (dppe) or diphenylbisphosphinomethane (dppm). When subscript y>0, then subscript z may be at least 2.

Each $R^7$ is a ligand, for example, an anionic ligand such as a halide (e.g., Br, or $Cl^-$), an alkoxide or related oxygenate ($OR^8$, or acetyl acetonate), an amide ($NR^8{}_2$), an alkyl group of 1 to 18 carbon atoms, or a hydride ($H^-$). In some cases, the complex needs to be activated in order to remove this ligand. Halides could be activated by treatment with a hydride such as $Li[HBEt_3]$ where Et represents an ethyl group, or reduction with a silver salt or an alkali metal such as sodium or lithium. Alkoxides or amides may activated upon reaction with a hydrosilane (either separately or the hydrosilane in the catalytic reaction). For alkyl ligands (an anionic carbon ligand, such as $[CH_2SiMe_3]^-$, where Me represents a methyl group, or $Me^-$, or $butyl^-$) these may activate upon (e.g., react off the complex) with the hydrosilane as well.

The hydride ligand is typically present in the active form of the catalyst. When $Co_2(CO)_8$ is used as the catalyst, it is expected to be activated in situ to form $Co(H)(CO)_4$.

Examples suitable catalysts for ingredient (C) include, but are not limited to dicobalt octacarbonyl.

The amount of ingredient (C) used in step (1) of the method described above depends on various factors including the specific organohydrogensiloxane oligomer selected for ingredient (A), the specific alkoxysilane selected for ingredient (B), and the temperature to which the mixture can be heated without boiling away the organohydrogensiloxane oligomer selected for ingredient (A). However, the amount of ingredient (C) may be sufficient to provide a molar amount of cobalt metal of 1 parts per million (ppm) to 100 ppm, alternatively 5 ppm to 80 ppm, alternatively 5 ppm to 20 ppm based on combined weights of ingredients (A) and (B). The method may optionally further comprise deactivation or removal of the catalyst. However, with appropriate catalyst loading, the step of deactivation or removal of the catalyst may be omitted.

The method described herein may be performed at 1 atmosphere of pressure or higher. Alternatively, the method may be performed at 1 atmosphere to 1.5 atmosphere. Step 1) may be performed at 0° C. to 150° C., alternatively 20° C. to 150° C., alternatively 30° C. to 150° C., and alternatively 50° C. to 100° C. The temperature for heating in step 1) depends on various factors including the pressure selected, however, heating may be performed at least 20° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 250° C. to 150° C., alternatively 30° C. to 100° C. The exact temperature selected depends on various factors including the selection of ligands present on the catalyst. For example, when $Co_2(CO)_8$, is used, the reaction temperature may be lower, such as 0° C. to 50° C. When the catalyst includes a dppm or dppe ligand, this may impart improved storage stability to the catalyst and allow for higher reaction temperatures. For example, when the catalyst is $Co_2(CO)_6$ (dppm), it may be stored at room temperature, whereas $Co_2(CO)_8$ may decompose unless stored at low temperatures (typically <0° C.).

Step (1) of the method described above produces a product comprising an alkoxy-functional organohydrogensiloxane oligomer. The alkoxy-functional organohydrogensiloxane oligomer has unit formula (XVII):

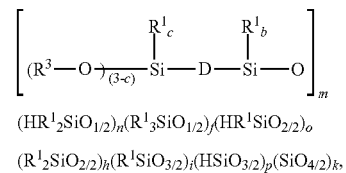

$(HR^1{}_2SiO_{1/2})_n(R^1{}_3SiO_{1/2})_f(HR^1SiO_{2/2})_o$ $(R^1{}_2SiO_{2/2})_h(R^1SiO_{3/2})_i(HSiO_{3/2})_p(SiO_{4/2})_k$, where
$R^1$, $R^3$, and subscripts c, f, h, i, and k are as described above, subscript b is 0 to 2, subscript m>0, and subscripts m, n, o, and p have values such that a quantity $(m+n+o+p)=(e+g+j)$, and each D is independently a divalent hydrocarbon group of 2 to 18 carbon atoms, with the proviso that >90 mol % of all D groups produced in step 1) are linear. Subscripts e, g, and j are as described above in formula (I). The method described herein provides the benefit that this alkoxy-functional organohydrogensiloxane oligomer is produced with high selectivity to the β-adduct compound, i.e., where D is linear, with either none or lower amounts of the corresponding α-adduct compound than existing methods using other catalysts.

The ingredients in step 1) of the method described above form a mixture, which may be homogeneous or heterogeneous. One or more additional ingredients, i.e., in addition to ingredients (A), (B), and (C) described above, may optionally be used in the method and composition described herein. The additional ingredient, when present, may be (D) a solvent or (E) a stabilizer, or both (D) and (E).

Ingredient (D) is a solvent that may be added to the mixture used in step 1) of the method described herein. One or more of ingredients (A), (B), and/or (C) may be provided in a solvent. For example, the ingredient (C) may be dissolved in a solvent that is added to the mixture in step 1). The solvent may facilitate contacting of reactants and catalyst, flow of the mixture and/or introduction of certain ingredients, such as the catalyst. Solvents used herein are those that help fluidize the ingredients of the mixture but essentially do not react with any of these ingredients. Solvents may be selected based on solubility the ingredients in the mixture and volatility. The solubility refers to the solvent being sufficient to dissolve ingredients of the mixture. Volatility refers to vapor pressure of the solvent. If the solvent is too volatile (having too high vapor pressure) the solvent may not remain in solution during heating. However, if the solvent is not volatile enough (too low vapor pressure) the solvent may be difficult to remove from the product or isolate from the alkoxy-functional organohydrogensiloxane oligomer.

The solvent may be an organic solvent. The organic solvent can be an aromatic hydrocarbon such as benzene, toluene, or xylene, or a combination thereof. Ingredient (D) may be one solvent. Alternatively, ingredient (D) may comprise two or more different solvents.

The amount of solvent can depend on various factors including the specific solvent selected and the amount and type of other ingredients selected for the mixture. However, the amount of solvent may range from 0% to 99%, or when present, 1% to 99%, and alternatively 2% to 50%, based on the weight of the mixture.

The method may optionally further comprise one or more additional steps. The method may further comprise a step of: recovering a fraction containing the alkoxy-functional organohydrogensiloxane oligomer from the product. Because the alkoxy-functional organohydrogensiloxane oligomer may comprise a β-adduct compound (i.e., where D is linear) and a corresponding α-adduct compound (i.e., where D is not linear) are difficult and/or costly to separate from one another, a fraction comprising both β-adduct compound and α-adduct compound may be recovered from the product after step 1) described above. It is desirable that this fraction contain >90% β-adduct compound, alternatively >90% to 100% β-adduct compound, alternatively 92% to 100%, alternatively >90% to <100%, alternatively 92% to <100%, and alternatively 95% to <100% β-adduct compound, based on the combined amounts of β-adduct compound and α-adduct compound in the fraction. Recovering this fraction may be performed by any convenient means, such as stripping or distillation, with heating or under vacuum, or a combination thereof.

The fraction described above comprising the β-adduct compound alkoxy-functional organohydrogensiloxane oligomer above is useful for functionalization of polyorganosiloxanes, including oligomers and longer chain polymers, containing aliphatically unsaturated functionality. For example, a hydrosilylation reaction of the SiH group in the alkoxy-functional organohydrogensiloxane oligomer of formula (XVII) with an aliphatically unsaturated group bonded to silicon in a polyorganosiloxane (such as a polydiorganosiloxane having aliphatically unsaturated terminal groups) can produce an alkoxy-functional polyorganosiloxane. The polyorganosiloxane having aliphatically unsaturated terminal groups may have unit formula (XVIII):
$(R^7R^8SiO_{1/2})_e(R^7R^8SiO_{2/2})_f(R^7SiO_{3/2})_g(SiO_{4/2})_h$, where each $R^7$ is independently a hydrogen atom, an alkyl group, an aryl group, a halogenated alkyl group, or a halogenated aryl group (such as those described above for $R^1$), and each $R^8$ is independently an aliphatically unsaturated hydrocarbon group such as an alkenyl group exemplified by alkenyl groups such as vinyl, allyl, butenyl, and hexenyl; and alkynyl groups such as ethynyl and propynyl. Subscript e is an integer of 0 or more, subscript f is an integer of 0 or more, subscript g is an integer of 0 or more, and subscript h is an integer of 0 or more, with the proviso that a quantity (f+g)>1. Alternatively, the polyorganosiloxane may be a polydiorganosiloxane. The polydiorganosiloxane having aliphatically unsaturated terminal groups may have formula (XIX):

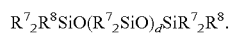

In formula (XIX), $R^7$ and $R^8$ are as described above. Subscript d may be 0 or a positive number. Alternatively, each $R^7$ may be an alkyl group or an aryl group as described above for $R^1$. Alternatively, subscript d has an average value of at least 2. Alternatively subscript d may have a value ranging from 2 to 2000.

The compound of formula (XIX) may comprise a polydiorganosiloxane such as
i) dimethylvinylsiloxy-terminated polydimethylsiloxane,
ii) dimethylvinylsiloxy-terminated poly(dimethylsiloxane/methylphenylsiloxane),
iii) dimethylvinylsiloxy-terminated poly(dimethylsiloxane/diphenylsiloxane),
iv) phenyl,methyl,vinyl-siloxy-terminated polydimethylsiloxane, or
v) dimethylhexenylsiloxy-terminated polydimethylsiloxane.

The alkoxy-functional polyorganosiloxane may be produced by combining the product or fraction including the β-adduct compound alkoxy-functional organohydrogensiloxane oligomer with a polydiorganosiloxane of formula (XIX) as described above.

The hydrosilylation reaction to prepare the alkoxy-functional polyorganosiloxane may be performed by a method comprising:
combining starting materials comprising
(a) the product (or fraction) comprising the β-adduct compound alkoxy-functional organohydrogensiloxane oligomer as described above,
(b) the polyorganosiloxane having at least one aliphatically unsaturated silicon bonded group per molecule as described above, and
(c) a hydrosilylation catalyst other than the cobalt complex described above. Suitable catalysts for catalyzing hydrosilylation reaction are known in the art and are commercially available. Such hydrosilylation catalysts can be a platinum group metal, such as platinum. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654. Combining the starting materials may be performed at elevated temperature, such as heating at 50° C. to 250° C.

The polyalkoxy-functional polyorganosiloxanes produced by the hydrosilylation of described above may have formula:
(XIII): $R^7{}_2R^{11}SiO(R^7{}_2SiO)_dSiR^7{}_2R^{11}$, where $R^7$ and subscript d are as described above, and each $R^{11}$ is polyalkoxyfunctional group, with the proviso that >90 mol % of $R^{11}$ are β-adduct. Alternatively, in formula (XIII), >90 mol % to 100 mol % of $R^{11}$ are β-adduct groups. Alternatively, in formula (XIII), 92% to <100% % of $R^{11}$ are β-adduct groups.

For example, when (b) the polyorganosiloxane having aliphatically unsaturated terminal groups is a polydiorganosiloxane of formula (XX):

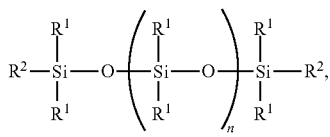

where subscript n is 1 to 2,000; the poly-alkoxy functional polyorganosiloxane may have formula (XXI):

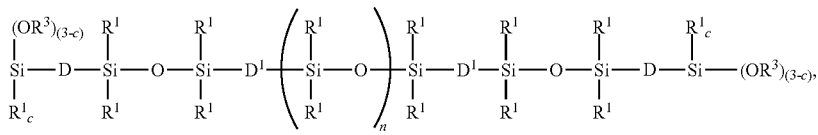

where each $D^1$ is independently a divalent hydrocarbon group; where $R^1$, $R^2$, D and subscript c are as described above.

Alternatively, the poly-alkoxy functional polyorganosiloxane may have formula (XXII):

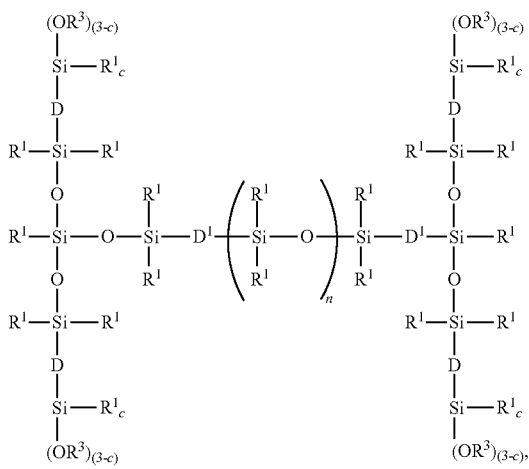

where each $D^1$ is independently a divalent hydrocarbon group; where $R^1$, $R^2$, D and subscript c are as described above.

The poly-alkoxy functional polyorganosiloxanes, such as polyalkoxy-functional polydimethylsiloxanes, prepared as described above can be used in any application that utilizes reactivity of the alkoxy groups.

For example, the poly-alkoxy functional polyorganosiloxane prepared as described above is useful in condensation reaction curable compositions, such as sealant compositions. Suitable condensation reaction curable compositions can be prepared by mixing starting materials comprising:
  (i) the alkoxy-functional polyorganosiloxane prepared as described above, and
  (ii) condensation reaction catalyst. Without wishing to be bound by theory, it thought that a condensation reaction curable composition including (i) the poly-alkoxy functional polyorganosiloxane will cure faster than a similar condensation reaction curable composition containing a different poly-alkoxy functional polyorganosiloxane (prepared using a conventional endblocker having higher branched isomer content).

Starting material (ii) is a condensation reaction catalyst. Suitable condensation reaction catalysts include tin catalysts and titanium catalysts. Suitable tin catalysts include organotin compounds where the valence of the tin is either +4 or +2, i.e., Tin (IV) compounds or Tin (II) compounds. Examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin® 740 and Fascat® 4202 from Acima Specialty Chemicals of Switzerland, Europe, which is a business unit of The Dow Chemical Company. Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Exemplary titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate and bis(acetoacetonyl)-diisopropoxy titanium (IV). A titanium catalyst may be used when the composition will be formulated as a room temperature vulcanizing sealant composition. The amount of condensation reaction catalyst depends on various factors including the amount of starting material (i) and the types and amounts of any additional starting materials added to the composition, however the amount of condensation reaction catalyst may be 0.2 to 6, alternatively 0.5 to 3, parts by weight based on the weight of starting material (i).

The condensation reaction curable composition may further comprise one or more additional ingredients distinct from ingredients (i) and (ii). Suitable additional ingredients are exemplified by (iii) a filler; (iv) a filler treating agent; (v) a crosslinker; (vi) a surface modifier; (vii) a drying agent; (viii) an extender, a plasticizer, or a combination thereof; (ix) a biocide; (x) a flame retardant; (xi) a chain lengthener; (xii) an endblocker; (xiii) a nonreactive binder; (xiv) an anti-aging additive; (xv) a water release agent; (xvi) a pigment; (xvii) a rheological additive; (xviii) a vehicle (such as a solvent and/or a diluent); (xix) a tackifying agent; (xx) a corrosion inhibitor; and a combination of two or more thereof. These additional ingredients and their amounts for use in a condensation reaction curable composition are exemplified by those disclosed, for example, in U.S. Pat. No. 9,156,948.

Starting material (iii) that may be added to the composition is a filler. The filler may comprise a reinforcing filler, an extending filler, or a combination thereof. For example, the composition may optionally further comprise ingredient (iii-1), a reinforcing filler, which when present may be added in an amount ranging from 0.1% to 95%, alternatively 1% to 60%, based on the weight of the composition. The exact amount of starting material (iii-1) depends on various factors including the form of the reaction product of the composition and whether any other fillers are added. Examples of suitable reinforcing fillers include precipitated calcium carbonates and reinforcing silica fillers such as fume silica, silica aerogel, silica xerogel, and precipitated silica. Suitable precipitated calcium carbonates include Winnofil® SPM from Solvay and Ultrapflex® and Ultrapflex® 100 from Specialty Minerals, Inc. Fumed silicas are known in the art and commercially available; e.g., fumed silica sold under the name CAB-O-SIL by Cabot Corporation of Massachusetts, U.S.A.

The composition may optionally further comprise starting material (iii-2) an extending filler in an amount ranging from 0.1% to 95%, alternatively 1% to 60%, and alternatively 1% to 20%, based on the weight of the composition. Examples of extending fillers include crushed quartz, aluminum oxide, magnesium oxide, calcium carbonate such as ground calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground quartz sold under the name MIN-U-SIL by U.S. Silica of Berkeley Springs, W. Va. Examples of extending calcium carbonates include CS-11 from Imerys, G3T from Huber, and Omyacarb 2T from Omya.

The composition may optionally further comprise starting material (iv) a treating agent. The amount of starting material (iv) can vary depending on factors such as the type of treating agent selected and the type and amount of particulates to be treated, and whether the particulates are treated before being added to the composition, or whether the particulates are treated in situ. However, starting material (iv) may be used in an amount ranging from 0.01% to 20%, alternatively 0.1% to 15%, and alternatively 0.5% to 5%, based on the weight of the composition. Particulates, such as the filler, the physical drying agent, certain flame retardants, certain pigments, and/or certain water release agents, when present, may optionally be surface treated with starting material (iv). Particulates may be treated with starting material (iv) before being added to the composition, or in situ. Starting material (iv) may comprise an alkoxysilane, an alkoxy-functional oligosiloxane, a cyclic polyorganosiloxane, a hydroxyl-functional oligosiloxane such as a dimethyl siloxane or methyl phenyl siloxane, or a fatty acid. Examples of fatty acids include stearates such as calcium stearate.

Some representative organosilicon filler treating agents that can be used as starting material (iv) include compositions normally used to treat silica fillers such as organochlorosilanes, organosiloxanes, organodisilazanes such as hexaalkyl disilazane, and organoalkoxysilanes such as $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other treating agents that can be used include alkylthiols, fatty acids, titanates, titanate coupling agents, zirconate coupling agents, and combinations thereof.

Alternatively, starting material (iv) may comprise an alkoxysilane having the formula (XXIII): $R^{13}_pSi(OR^{14})_{(4-p)}$, where subscript p may have a value ranging from 1 to 3, alternatively subscript p is 3. Each $R^{13}$ is independently a monovalent organic group, such as a monovalent hydrocarbon group of 1 to 50 carbon atoms, alternatively 8 to 30 carbon atoms, alternatively 8 to 18 carbon atoms. $R^{13}$ is exemplified by alkyl groups such as hexyl, octyl, dodecyl, tetradecyl, hexadecyl, and octadecyl; and aromatic groups such as benzyl and phenylethyl. $R^{13}$ may be saturated or unsaturated, and branched or unbranched. Alternatively, $R^{13}$ may be saturated and unbranched.

Each $R^{14}$ is independently a saturated hydrocarbon group of 1 to 4 carbon atoms, alternatively 1 to 2 carbon atoms. Starting material (iv) is exemplified by hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

Alkoxy-functional oligosiloxanes may also be used as treating agents. For example, suitable alkoxy-functional oligosiloxanes include those of the formula (XXIV): $(R^{15}O)_q Si(OSiR^{16}_2R^{17})_{(4-q)}$. In this formula, subscript q is 1, 2 or 3, alternatively subscript q is 3. Each $R^{15}$ may be an alkyl group. Each $R^{16}$ may be an unsaturated monovalent hydrocarbon group of 1 to 10 carbon atoms. Each $R^{17}$ may be an unsaturated monovalent hydrocarbon group having at least 10 carbon atoms.

Alternatively, a polyorganosiloxane capable of hydrogen bonding is useful as a treating agent. This strategy to treating surface of a filler takes advantage of multiple hydrogen bonds, either clustered or dispersed or both, as the means to tether the compatibilization moiety to the filler surface. The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to a filler. The polyorganosiloxane may be incapable of forming covalent bonds with the filler. The polyorganosiloxane may be free of condensable silyl groups e.g., silicon bonded alkoxy groups, silazanes, and silanols. The polyorganosiloxane capable of hydrogen bonding may be selected from the group consisting of a saccharide-siloxane polymer, an amino-functional polyorganosiloxane, and a combination thereof. Alternatively, the polyorganosiloxane capable of hydrogen bonding may be a saccharide-siloxane polymer.

Starting material (v) is a crosslinker. Starting material (v) may comprise a silane crosslinker having hydrolyzable groups or partial or full hydrolysis products thereof. Starting material (v) has an average, per molecule, of greater than two substituents reactive with the alkoxy groups on starting material (i). Examples of suitable silane crosslinkers for starting material (v) may have general formula (XXV): $R^{10}_kSi(R^9)_{(4-k)}$, where each $R^{10}$ is independently a monovalent hydrocarbon group such as an alkyl group; each $R^9$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript k may be 0, 1, 2, or 3. For starting material (v), subscript k has an average value greater than 2. Alternatively, subscript k may have a value ranging from 3 to 4. Alternatively, each $R^9$ may be independently selected from hydroxyl, alkoxy, acetoxy, amide, or oxime. Alternatively, starting material (v)

may be selected from an acyloxysilane, an alkoxysilane, a ketoximesilane, and an oximosilane.

Starting material (v) may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. The amount of the alkoxysilane that is used in the composition may range from 0.5 to 15, parts by weight per 100 parts by weight of starting material (i).

Starting material (v) may comprise an acyloxysilane, such as an acetoxysilane. Acetoxysilanes include a tetraacetoxysilane, an organotriacetoxysilane, a diorganodiacetoxysilane, or a combination thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. Alternatively, starting material (v) may comprise organotriacetoxysilanes, for example mixtures comprising methyltriacetoxysilane and ethyltriacetoxysilane. The amount of the acetoxysilane that is used in the curable silicone composition may range from 0.5 to 15 parts by weight per 100 parts by weight of starting material (i); alternatively 3 to 10 parts by weight of acetoxysilane per 100 parts by weight of starting material (i).

Examples of silanes suitable for starting material (v) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Aminofunctional alkoxysilanes suitable for starting material (v) are exemplified by $H_2N(CH_2)_3Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Suitable oximosilanes for starting material (v) include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Suitable ketoximosilanes for starting material (v) include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

Alternatively, starting material (v) may be polymeric. For example, starting material (v) may comprise a disilane such as bis(triethoxysilyl)hexane, 1,4-bis[trimethoxysilyl(ethyl)]benzene, and bis[3-(triethoxysilyl)propyl]tetrasulfide.

Starting material (v) can be one single crosslinker or a combination comprising two or more crosslinkers that differ in at least one of the following properties: hydrolyzable substituents and other organic groups bonded to silicon, and when a polymeric crosslinker is used, siloxane units, structure, molecular weight, and sequence. Starting material (vi) is an adhesion promoter. Suitable adhesion promoters for starting material (vi) may comprise a hydrocarbonoxysilane such as an alkoxysilane, a combination of an alkoxysilane and a hydroxy-functional polyorganosiloxane, an aminofunctional silane, a mercaptofunctional silane, or a combination thereof. Adhesion promoters are known in the art and may comprise silanes having the formula (XXV): $R^{24}_tR^{25}_uSi(OR^{26})_{4-(t+u)}$ where each $R^{24}$ is independently a monovalent organic group having at least 3 carbon atoms; $R^{25}$ contains at least one SiC bonded substituent having an adhesion-promoting group, such as amino, epoxy, mercapto or acrylate groups; subscript t has a value ranging from 0 to 2; subscript u is either 1 or 2; and the sum of (t+u) is not greater than 3. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula (XXVI): $R^{27}_vSi(OR^{28})_{(4-v)}$, where subscript v is 1, 2, or 3, alternatively subscript v is 1. Each $R^{27}$ is independently a monovalent organic group with the proviso that at least one $R^{27}$ is an unsaturated organic group or an epoxy-functional organic group. Epoxy-functional organic groups for $R^{27}$ are exemplified by 3-glycidoxypropyl and (epoxycyclohexyl)ethyl. Unsaturated organic groups for $R^{27}$ are exemplified by 3-methacryloyloxypropyl, 3-acryloyloxypropyl, and unsaturated monovalent hydrocarbon groups such as vinyl, allyl, hexenyl, undecylenyl. Each $R^{28}$ is independently a saturated hydrocarbon group of 1 to 4 carbon atoms, alternatively 1 to 2 carbon atoms. $R^{28}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2H(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl)ethylenediamine, and a combination thereof.

Alternatively, the adhesion promoter may comprise a mercaptofunctional alkoxysilane, such as 3-mercaptopropyltrimethoxysilane or 3-mercaptopropyltriethoxysilane.

The exact amount of starting material (vi) depends on various factors including the type of adhesion promoter selected and the end use of the composition and its reaction product. However, starting material (vi), when present, may be added to the composition in an amount ranging from 0.01 to 50 weight parts based on the weight of the composition, alternatively 0.01 to 10 weight parts, and alternatively 0.01 to 5 weight parts. Starting material (vi) may be one adhesion promoter. Alternatively, starting material (vi) may comprise two or more different adhesion promoters that differ in at least one of the following properties: structure, viscosity, average molecular weight, polymer units, and sequence.

When selecting ingredients for the condensation reaction curable composition described above, there may be overlap between types of starting materials because certain starting materials described herein may have more than one function. For example, certain alkoxysilanes may be useful as filler treating agents, as adhesion promoters, and as crosslinkers.

Alternatively, the crosslinker, the filler, and the adhesion promoter may each be present in the composition. In this embodiment, the crosslinker may comprise an alkyl trialkoxysilane, such as methyltrimethoxysilane; the filler may comprise an extending filler such as calcium carbonate; and the adhesion promoter may comprise an alkoxysilane other than the crosslinker, such as N-(3-(trimethoxysilyl)propyl)ethylenediamine, 3-mercaptopropyltrimethoxysilane, or both The composition described above may be prepared as a one part composition, for example, by combining all ingredients by any convenient means, such as mixing. For example, a one-part composition may be made by optionally combining (e.g., premixing) (i) the alkoxy-functional polyorganosiloxane with all or part of (iii) the filler, when present; and mixing this with a pre-mix comprising the catalyst (ii) and, when present (v) the crosslinker. Other additives such as an anti-aging additive and a pigment may be added to the mixture at any desired stage. A final mixing step may be performed under substantially anhydrous conditions, and the resulting compositions are generally stored under substantially anhydrous conditions, for example in sealed containers, until ready for use.

Alternatively, the composition may be prepared as a multiple part (e.g., 2 part) composition when a crosslinker is present. In this instance the catalyst and crosslinker are stored in separate parts, and the parts are combined shortly before use of the composition. For example, a two part curable composition may be prepared by combining ingredients comprising the alkoxy-functional polyorganosiloxane and the crosslinker to form a first (curing agent) part by any convenient means such as mixing. A second (base) part may be prepared by combining starting materials comprising a catalyst and the alkoxy-functional polyorganosiloxane by any convenient means such as mixing. The starting materials may be combined at ambient or elevated temperature and under ambient or anhydrous conditions, depending on various factors including whether a one part or multiple part composition is selected. The base part and curing agent part may be combined by any convenient means, such as mixing, shortly before use. The base part and curing agent part may be combined in relative amounts of base: curing agent ranging from 1:1 to 10:1.

The equipment used for mixing the starting materials is not specifically restricted. Examples of suitable mixing equipment may be selected depending on the type and amount of each ingredient selected. For example, agitated batch kettles may be used for relatively low viscosity compositions, such as compositions that would react to form gums or gels. Alternatively, continuous compounding equipment, e.g., extruders such as twin screw extruders, may be used for more viscous compositions and compositions containing relatively high amounts of particulates. Exemplary methods that can be used to prepare the compositions described herein include those disclosed in, for example, U.S. Patent Publications US 2009/0291238 and US 2008/0300358.

These compositions made as described above may be stable when the stored in containers that protect the compositions from exposure to moisture, but these compositions may react via condensation reaction when exposed to atmospheric moisture.

EXAMPLES

These examples are intended to illustrate some embodiments of the invention and should not be interpreted as limiting the scope of the invention set forth in the claims. In the examples below, the examples were performed under inert conditions, i.e., the flask was purged with nitrogen before adding starting materials. The disiloxane, trisiloxane, and siloxane oligomers starting materials were purified by contacting with basic $Al_2O_3$ to decrease acid concentration, such as disclosed in U.S. Pat. No. 5,026,890 (see example 15). The following starting materials and abbreviations are defined as follows:

| Abbreviation | Definition |
|---|---|
| TMDS | 1,1,3,3-tetramethyldisiloxane, example of starting material A) |
| M'D'M' | 1,1,3,5,5-pentamethyltrisiloxane, example of starting material A) |
| M'T$^{Pr}$ | Siloxane oligomer having 3 $(Me_2HSiO_{1/2})$ units and having one $(PrSiO_{3/2})$ unit, where Me represents a methyl group and Pr represents a propyl group. |
| VTMS | Vinyltrimethoxysilane, example of starting material B) |
| $Co_2(CO)_8$ | Dicobalt octacarbonyl |
| $Co_2(CO)_6$(dppm) | Dicobalt hexacarbonyl 1,1-bis(diphenylphosphino)methane |
| THF | Tetrahydrofuran, example of a solvent |
| GC-FID | Gas chromatography with flame ionization detection |
| GC-MS | Gas chromatography, mass spectrometry |
| MeSi(OMe)$_3$ | Methyl trimethoxysilane |
| Ti(OiPr)$_2$(EAA)$_2$ | Titanium Diisopropoxide Di(Ethyl Acetoacetate) |
| Ti(OBu)$_4$ | Titanium tetrabutoxide |
| (MeO)$_3$Si(CH$_2$)SH | Thiopropyl Trimethoxysilane |
| (MeO)$_3$Si(CH$_2$)$_3$NH(CH$_2$)$_2$NH$_2$ | Aminoethylaminopropyl Trimethoxysilane |

"Yield" means molar amount alkoxy-functional organohydrogensiloxane oligomer produced/molar amount alkoxy-functional organohydrogensiloxane oligomer possible based on the amount of limiting reagent (the aliphatically unsaturated alkoxysilane). "Selectivity" means the ratio of linear isomer/branched isomer of the alkoxy-functional organohydrogensiloxane (where isomers have the same molecular weight).

Example 1

A stock solution of 0.005 M $Co_2(CO)_8$ in toluene was generated and stored at −30° C. The solution was briefly removed from the freezer prior to use. In an air-free glovebox, a mixture of 1.1 g of VTMS, 1 g of TMDS, and 0.25 g of dodecane (internal standard) was added to a 20 mL scintillation vial containing a stirbar. Then 30 μL of a 0.005 M solution of $Co_2(CO)_8$ in toluene was added. After stirring at room temperature for 30 min, the reaction mixture was heated to 50° C. for 16 h. At this stage, an aliquot (~150 μL) of the reaction mixture was withdrawn and injected into a GC vial, and diluted with ~1 mL of xylene. The reaction was analyzed by GC-FID and GC-MS. Analysis indicated ~50% yield of the linear monohydrosilylation product, 15% of the double hydrosilylation product, and with only a trace amount of the branched isomer products detected. Significant amounts of unreacted starting materials were observed.

Example 2

A sample of $Co_2(CO)_6$ (dppm) was stored at room temperature for several months prior to use, and then a stock solution of 0.005 M $Co_2(CO)_6$ (dppm) in toluene was generated. In an air-free glovebox, a mixture of 1.1 g of VTMS, 1 g of TMDS, and 0.25 g of dodecane (internal standard) was added to a 20 mL scintillation vial containing a stirbar. Then 30 μL of a 0.005 M solution of $Co_2(CO)_6$ (dppm) in toluene was added. After stirring at room temperature for 30 min, the reaction mixture was heated to 50° C. for 16 h. At this stage, an aliquot (~150 μL) of the reaction mixture was withdrawn and injected into a GC vial, and diluted with ~1 mL of xylene. The reaction was analyzed by GC-FID and GC-MS. Analysis indicated ~38% yield of the linear monohydrosilylation product, ~24% of the double hydrosilylation product, and with only a trace amount of the branched isomer products detected. Significant amounts of unreacted starting materials were observed. This example demonstrates that a cobalt carbonyl phosphine complex can also a more thermally-stable cobalt carbonyl complex in comparison to $Co_2(CO)_8$. This example demonstrates a more thermally-stable cobalt carbonyl complex in comparison to $Co_2(CO)_8$.

Example 3 (Comparative)

In an air-free glovebox, a mixture of 1.1 g of VTMS, 1 g of TMDS, and 0.25 g of dodecane (internal standard) was added to a 20 mL scintillation vial containing a stirbar. Then 30 μL of a 0.01 M solution of Rh(PPh$_3$)$_3$Cl in THF was added (this reagent solution was heated to ~60° C. with stirring in order to dissolve the poorly soluble catalyst). After stirring at room temperature for 30 min, the reaction mixture was heated to 50° C. for 16 h. At this stage, an aliquot (~150 μL) of the reaction mixture was withdrawn and injected into a GC vial, and diluted with ~1 mL of xylene. The reaction was analyzed by GC-FID and GC-MS. Analysis indicated ~54% yield of the linear product with 8% of the branched isomer detected. A small amount of unreacted starting materials were observed. This example 3 shows less selectivity than example 1 to the desired beta-adduct in the product.

Example 4 (Comparative)—Preparation of Ethyltrimethoxysilyl-Terminated Tetramethyldisiloxane In an air-free glovebox, a mixture of 1.1 g of VTMS, 1 g of TMDS, and 0.25 g of dodecane (internal standard) was added to a 20 mL scintillation vial containing a stirbar. Then 304 of a 0.01 M solution of Pt in THF in the form of Karstedt's catalyst (supplied as 2% in xylene, Sigma Aldrich) was added (this reagent solution was heated to ~60° C. with stirring in order to dissolve the poorly soluble catalyst). After stirring at room temperature for 30 min, the reaction mixture was heated to 50° C. for 16 h. At this stage, an aliquot (~150 μL) of the reaction mixture was withdrawn and injected into a GC vial, and diluted with ~1 mL of xylene. The reaction was analyzed by GC-FID and GC-MS.

Analysis indicated ~46% yield of the linear product with 26% of the branched isomer detected. A small amount of unreacted tetramethyldisiloxane was observed but all of the vinyltrimethoxysilane was observed.

Example 5 (Comparative)—Preparation of di(trimethoxysilylethyl)pentamethyltrisiloxane (M'D'M' EHM)

A solution of 1% Pt catalyst in toluene was prepared. VTM in an amount of 18.05 g was added at a rate of 275 µL/min to a flask containing 11.97 g M'D'M' in at a temperature of 40° C. under $N_2$ with rapid stirring while cooling the flask, by means of a syringe pump. 5% of the total VTM was initially added, followed by 10 pm Pt catalyst (39 µL of the 1% solution Pt in toluene) to start the exotherm, and then the addition of the remaining VTM was begun. The temperature was monitored by a thermocouple and kept below 80° C. by controlling the addition rate. After the complete addition of VTM, the reaction solution was stirred at 75° C. for 0.5 h, allowed to cool, and characterized by GC which showed the product mixture contained 10% monofunctional oligomer, 68% difunctional oligomer, and 20% trifunctional oligomer. The sample was purified by distillation under 1 Torr (0.1333 kPa) to give 16.9 g M'D'M' EHM (yield: 56%) with a boiling point of 135-137° C. at 1 Torr (0.1333 kPa). The sample was characterized by GC, $^1$H, and $^{29}$Si NMR. The final product was composed of 66% β isomers of M'D'H' EHM and 34% α isomers of M'D'M' EHM; 60% D-H isomer (first product structure in the reaction scheme shown below) and 40% M-H isomer (second product structure in the reaction scheme shown below). $^1$H NMR (CDCl$_3$): δ 4.69 (M-H), 4.62 (D-H), 3.55 (—OCH$_3$), 1.06 (—CH$_3$ from α isomer), 0.56 (—CH$_2$CH$_2$— from β isomer), 0.25 to 0 (—CH$_3$ and —CH(Me)-). $^{29}$Si NMR (CDCl$_3$): δ11 to 9 (M-D'), 9 to 7 (M-D), –6 to –8 (M), –19 to –23 (D), –35 to –38 (D'), –40 to –43 (7).

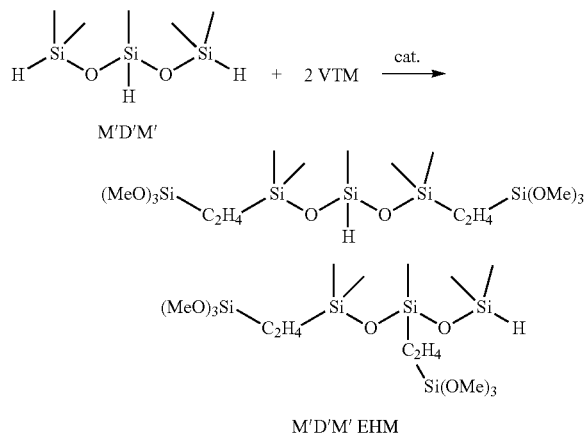

Example 6 (Prophetic)—Preparation of di(trimethoxysilylethyl)pentamethyltrisiloxane (M'D'M' EHM)

A cobalt catalyst, dicobalt octacarbonyl, will be dissolved in THF to prepare a 1 millimolar (mM) catalyst solution. A three-neck round bottom flask fitted with a thermocouple and a cold water condenser will be charged with 9.96 g and 15.04 g VTM. The flask will be purged with $N_2$, and the mixture in the flask will be heated to 80° C., followed by the addition of catalyst solution (1 mL). After 17 h stirring at 80° C. under $N_2$, the reaction mixture will be allowed to cool to room temperature of 25° C. and will be analyzed by GC.

Example 7 (Comparative)—Preparation of di(trimethoxysilylethyl) Siloxane Oligomer (Pr-T EHM)

The procedure of Example 5 was repeated, except that M'T$^{Pr}$ (15.0 g), VTM (15.0 g), and platinum catalyst solution in toluene 39 µL) were used as starting materials. The crude product contained 14% monofunctional oligomer, 54% difunctional oligomer, and 31% trifunctional oligomer by GC (FID). The sample was purified by distillation under 1 Torr (0.1333 kPa) to give 13.5 g pure Pr-T EHM (yield: 45%). This was characterized by GC (retention time: 30.8-31.1 min), $^1$H, and $^{29}$Si NMR. This sample was composed of 70% β isomer of Pr-T EHM and 30% α isomer of Pr-T EHM. $^1$H NMR (CDCl$_3$): δ 4.69 (Si—H), 3.55 (—OCH$_3$), 1.36 (CH$_3$CH$_2$CH$_2$—), 1.09 (—CH$_3$ from α isomer), 0.92 (CH$_3$CH$_2$CH$_2$—), 0.56 (-CH$_2$CH$_2$— from β isomer), 0.45 (CH$_3$CH$_2$CH$_2$—), 0.2 to 0 (—SiCH$_3$). $^{29}$Si NMR (CDCl$_3$): δ 10 to 7 (M), –6 to –8 (M), –40 to –43 (T-OMe), –63 to –65 (T-Pr).

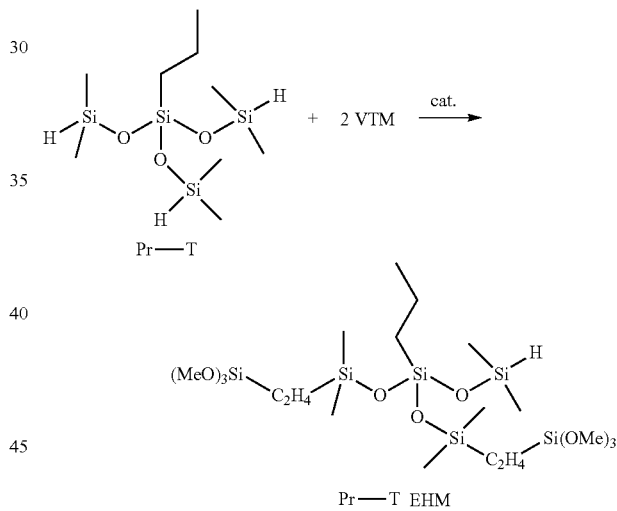

Example 8—Preparation of di(trimethoxysilylethyl-pentamethyltrisiloxane (Pr-T EHM)

The procedure of example 6 will be repeated, except that M'T$^{Pr}$ (29.7 g), VTM (29.7 g), and dicobalt octacarbonyl (4 mM in THF, 0.5 mL, 2 µmol) will be used as starting materials. The reaction will be conducted at 80° C. for 7 h.

| Example | Product | β/α ratio |
| --- | --- | --- |
| 5 (comparative) | M'D'M' EHM | 66/34 |
| 7 (comparative) | Pr-T EHM | 70/30 |
| 6 | M'D'M' EHM | |
| 8 | Pr-T EHM | |

Example 9 (Comparative)

A sample of $Co_2(CO)_6(PMe_3)_2$ was stored at room temperature for several months prior to use, and then a stock solution of 0.005 M $Co_2(CO)_6(PMe_3)_2$ in toluene was generated. In an air-free glovebox, a mixture of 1.1 g of VTMS, 1 g of TMDS, and 0.25 g of dodecane (internal standard) was added to a 20 mL scintillation vial containing a stirbar. Then 30 µL of a 0.005 M solution of $Co_2(CO)_6(PMe3)_2$ in toluene was added. After stirring at room temperature for 30 min, the reaction mixture was heated to 50° C. for 16 h. At this stage, an aliquot (~150 µL) of the reaction mixture was withdrawn and injected into a GC vial, and diluted with ~1 mL of xylene. The reaction was analyzed by GC-FID (gas chromatography with flame ionization detector) and GC-MS (gas chromatography with mass spectrometery). Analysis indicated that no reaction had occurred. This example demonstrates that chelating diphosphine may provide better catalytic activity when a phosphine ligand is included in the cobalt catalyst.

Example 10 (Reference)—Compounding Procedure for Sealant Composition Samples To a speed mixer cup was added 210.88 g of a trimethoxy-functional polydimethylsiloxane prepared by hydrosilylation reaction of an ethyltrimethoxysilyl-terminated tetramethyldisiloxane (prepared in an example as described above) and an α,ω-vinyl-terminated polydimethylsiloxane. A slurry of methyltrimethoxysilane, tetra-n-butoxy titanate, 3-mercaptopropyltrimethoxysilane, slurry of 80% titanium ethyl acetoacetate 20% methyltrimethoxysilane, and N-(3-(trimethoxysilyl)propyl)ethylenediamine was prepared in a ratio equivalent to the ratio shown in a table below. From this slurry, 13.16 g was added to the speed mixer cup. The cup was mixed in a DAC 600.2 VAC-P Speedmixer for 30 seconds at 800 revolutions per minute (rpm), then 30 seconds at 1500 rpm. Next, 149.2 g of precipitated calcium carbonate was added to the cup and mixed 30 seconds at 800 rpm, and 30 seconds at 1500 rpm. The sides and bottom of the cup were then scraped by hand with a spatula. Next 26.76 g of ground calcium carbonate was added to the cup and it was mixed for 30 seconds at 800 rpm and 30 seconds at 1500 rpm. Again, the sides and bottom of the cup were hand scraped with a spatula. Finally, the cup was fitted with a cap that contained a hole as to allow the contents of the cup to be exposed to a vacuum environment. The cup was de-aired by mixing 30 seconds at 800 rpm and 5 pounds per square inch (psi) (34.5 kPa), 30 seconds at 1500 rpm and 5 psi (34.5 kPa), and 30 seconds at 800 rpm and 14.7 psi (101.35 kPa). The resulting sealant composition was transferred to Semco® tubes via a hand operated cup press.

In these comparative examples 11 and 12, two comparative samples were prepared according to the table below. (Sealant Composition 1 and Sealant Composition 2)

Comparative sample using polydimethylsiloxane 100% endcapped with the ethyltrimethoxysily-terminated tetramethyldisiloxane prepared in Comparative Example 4)

| Speedmixer Starting Materials | Amount (g) |
| --- | --- |
| Polydimethylsiloxane 100% end capped with 70% β ethyltrimethoxysilyl group containing tetramethyldisiloxane and 30% α ethyltrimethoxy silyl group containing tetramethyldisiloxane (the | 210.88 |

Comparative sample using polydimethylsiloxane 100% endcapped with the ethyltrimethoxysily-terminated tetramethyldisiloxane prepared in Comparative Example 4)

| Speedmixer Starting Materials | Amount (g) |
| --- | --- |
| ethyltrimethoxysilyl-terminated tetramethyldisiloxane prepared in comparative example 4) | |
| Precipitated Calcium Carbonate | 149.2 |
| Ground Calcium Carbonate | 26.76 |
| Methyltrimethoxysilane | 7.36 |
| Tetra-n-butoxy titanate | 1.32 |
| 3-Mercaptopropyltrimethoxysilane | 0.76 |
| Slurry 80% Titanium Ethyl Acetoacetate 20% Methyltrimethoxysilane | 3.52 |
| N-(3-(Trimethoxysilyl)propyl)ethylenediamine | 0.2 |

In these prophetic examples, 13-16, samples will be prepared according to the table below. (Sealant Compositions 3, 4, 5, and 6)

(Prophetic) Samples will be prepared using a polydimethylsiloxane capped with a product prepared as described in Example 1, 2, 6, and 8

| Speedmixer Component | Amount (g) |
| --- | --- |
| Polydimethylsiloxane 100% end capped with the ethyltrimethoxy-functional siloxanes prepared in Example 1, 2, 6, or 8 | 210.88 |
| Precipitated Calcium Carbonate | 149.2 |
| Ground Calcium Carbonate | 26.76 |
| Methyltrimethoxysilane | 7.36 |
| Tetra-n-butoxy titanate | 1.32 |
| 3-Mercaptopropyltrimethoxysilane | 0.76 |
| Slurry 80% Titanium Ethyl Acetoacetate 20% Methyltrimethoxysilane | 3.52 |
| N-(3-(Trimethoxysilyl)propyl)ethylenediamine | 0.2 |

The composition samples prepared as described above will be evaluated using the following test methods for Tack Free Time (TFT) and Skin Over Time (SOT).

TFT was tested as follows. A 100 mil slab of sealant was drawn down on a piece of polyethylene terephthalate (PET). A small strip of PET is then lightly pressed onto the surface of the sealant to check for cure. When no sealant is transferred to the strip of PET, the sealant is considered tack free.

SOT was tested as follows. A 100 mil slab of sealant was drawn down on a piece of PET. A sealant is considered to have become skinned over when no sealant transfers to a gloved or bare finger when lightly touched.

The table below shows testing done on the comparative sealant composition samples prepared as described above. On an 8 millimeter (mm) parallel plate constant stress rheometer, a dollop of uncured sealant was pressed to 1.829 mm and trimmed with a razor blade. The sealant was cured in place for the time specified. Next, a constant stress of 0.5 psi (3.45 kPa) was applied for the time specified. The stress was then released and the sealant was allowed to recover for five minutes. Sealant with a faster cure will creep less during the stress period, and will recover more closely to zero during the recovery period.

| Sample # | Description | TFT (min) | SOT (min) |
| --- | --- | --- | --- |
| Sealant Composition 1 | Comparative sample using polydimethylsiloxane 100% endcapped with the ethyltrimethoxysilyl-terminated | 40 | 19 |

-continued

| Sample # | Description | TFT (min) | SOT (min) |
|---|---|---|---|
| (comparative) Sealant Composition 2 (comparative) | tetramethyldisiloxane prepared in Comparative Example 4) 70% β 30% α Comparative sample using polydimethylsiloxane 100% endcapped with the ethyltrimethoxysilyl-terminated tetramethyldisiloxane prepared in Comparative Example 4) | 36 | 22 |

Examples 17 to 46 (Prophetic)—Procedure for Compounding Sealants

To a speedmixer cup was added the polymer in one of the tables below. A slurry of methyltrimethoxysilane, slurry of 80% titanium ethyl acetoacetate 20% methyltrimethoxysilane, tetra-n-butoxy titanate, 3-mercaptopropyltrimethoxysilane, and N-(3-(trimethoxysilyl)propyl)ethylenediamine was prepared in a ratio equivalent to the ratio seen in the formulations in the tables below. Note that some composition samples did not contain all starting materials listed above. To the cup was added the slurry equivalent to the sum of its starting materials. The cup was then mixed in a DAC 600.2 VAC-P Speedmixer one minute at 1500 rpm. Next, the allotment of precipitated calcium carbonate and ground calcium carbonate, where used, was added to the cup and mixed 30 seconds at 2000 rpm. Finally, the cup was fitted with a cap that contained a hole as to allow the contents of the cup to be exposed to a vacuum environment. The cup was de-aired by mixing 30 seconds at 800 rpm and 5 psi (34.5 kPa), 30 seconds at 1500 rpm and 5 psi (34.5 kPa), and 30 seconds at 800 rpm and 14.7 psi (101.35 kPa). The resulting sealant was transferred to Semco® tubes via a hand operated cup press. A reasonable variance was allowed when adding ingredients.

| Sample 17 | |
|---|---|
| Speedmixer Component | Amount (g) |
| Polydimethylsiloxane 100% end capped with 66.4% β ethyltrimethoxy tetramethyldisiloxane | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 18 | |
|---|---|
| Speedmixer Component | Amount (g) |
| Polydimethylsiloxane 100% end capped with 76.6% β ethyltrimethoxy tetramethyldisiloxane | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 19 | |
|---|---|
| Speedmixer Component | Amount (g) |
| Polydimethylsiloxane 100% end capped with 86.8% β ethyltrimethoxy tetramethyldisiloxane | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 20 | |
|---|---|
| Speedmixer Component | Amount (g) |
| Polydimethylsiloxane 100% end capped with 96.4% β ethyltrimethoxy tetramethyldisiloxane | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 21 | |
|---|---|
| Speedmixer Component | Amount (g) |
| Polydimethylsiloxane 80% end capped with 65% β Pr-T EHM | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 22 | |
|---|---|
| Speedmixer Component | Amount (g) |
| Polydimethylsiloxane 100% end capped with 95% β Pr-T EHM | 207.19 |
| Precipitated Calcium Carbonate | 150.04 |
| Methyltrimethoxysilane | 8.88 |
| Slurry 80% Titanium Ethyl Acetoacetate 20% Methyltrimethoxysilane | 3.70 |
| N-(3-(Trimethoxysilyl)propyl)ethylenediamine | 0.19 |

| Sample 23 | |
|---|---|
| Speedmixer Component | Amount (g) |
| Polydimethylsiloxane 100% end capped with 66.4% β ethyltrimethoxy tetramethyldisiloxane | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 24

| Speedmixer Component | Amount (g) |
|---|---|
| Polydimethylsiloxane 100% end capped with 76.6% β ethyltrimethoxy tetramethyldisiloxane | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 25

| Speedmixer Component | Amount (g) |
|---|---|
| Polydimethylsiloxane 100% end capped with 86.8% β ethyltrimethoxy tetramethyldisiloxane | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 26

| Speedmixer Component | Amount (g) |
|---|---|
| Polydimethylsiloxane 100% end capped with 96.4% β ethyltrimethoxy tetramethyldisiloxane | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 27

| Speedmixer Component | Amount (g) |
|---|---|
| Polydimethylsiloxane 100% end capped with 65% β Pr-T EHM | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 28

| Speedmixer Component | Amount (g) |
|---|---|
| Polydimethylsiloxane 100% end capped with 95% β Pr-T EHM | 163.47 |
| Precipitated Calcium Carbonate | 118.53 |
| Ground Calcium Carbonate | 9.75 |
| Methyltrimethoxysilane | 4.83 |
| Slurry 80% Titanium Ethyl Acetoacetate 20% Methyltrimethoxysilane | 2.25 |
| Tetra-n-butoxy titanate | 0.84 |
| 3-Mercaptopropyltrimethoxysilane | 0.33 |

Sample 29

| Speedmixer Component | Amount (g) |
|---|---|
| Polydimethylsiloxane 100% end capped with 66.4% β ethyltrimethoxy tetramethyldisiloxane | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

Sample 30

| Speedmixer Component | Amount (g) |
|---|---|
| Polydimethylsiloxane 100% end capped with 76.6% β ethyltrimethoxy tetramethyldisiloxane | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

Sample 31

| Speedmixer Component | Amount (g) |
|---|---|
| Polydimethylsiloxane 100% end capped with 86.8% β ethyltrimethoxy tetramethyldisiloxane | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

Sample 32

| Speedmixer Component | Amount (g) |
|---|---|
| Polydimethylsiloxane 100% end capped with 96.4% β ethyltrimethoxy tetramethyldisiloxane | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

| Sample 33 | |
|---|---|
| Speedmixer Component | Amount (g) |
| Polydimethylsiloxane 100% end capped with 65% β Pr-T EHM | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

| Sample 34 | |
|---|---|
| Speedmixer Component | Amount (g) |
| Polydimethylsiloxane 100% end capped with 95% β Pr-T EHM | 171.9 |
| Precipitated Calcium Carbonate | 108.99 |
| Ground Calcium Carbonate | 62.1 |
| Methyltrimethoxysilane | 7.62 |
| Slurry 80% Titanium Ethyl Acetoacetate 20% Methyltrimethoxysilane | 2.76 |
| Tetra-n-butoxy titanate | 1.26 |
| 3-Mercaptopropyltrimethoxysilane | 0.87 |
| N-(3-(Trimethoxysilyl)propyl)ethylenediamine | 0.39 |

| Sample 35 | |
|---|---|
| Speedmixer Component | Amount (g) |
| Polydimethylsiloxane 100% end capped with 66.4% β ethyltrimethoxy tetramethyldisiloxane | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 36 | |
|---|---|
| Speedmixer Component | Amount (g) |
| Polydimethylsiloxane 100% end capped with 76.6% β ethyltrimethoxy tetramethyldisiloxane | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 37 | |
|---|---|
| Speedmixer Component | Amount (g) |
| Polydimethylsiloxane 100% end capped with 86.8% β ethyltrimethoxy tetramethyldisiloxane | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 38 | |
|---|---|
| Speedmixer Component | Amount (g) |
| Polydimethylsiloxane 100% end capped with 96.4% β ethyltrimethoxy tetramethyldisiloxane | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 39 | |
|---|---|
| Speedmixer Component | Amount (g) |
| Polydimethylsiloxane 100% end capped with 65% β Pr-T EHM | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 40 | |
|---|---|
| Speedmixer Component | Amount (g) |
| Polydimethylsiloxane 100% end capped with 95% β Pr-T EHM | 158.22 |
| Precipitated Calcium Carbonate | 131.22 |
| Methyltrimethoxysilane | 7.26 |
| Slurry 80% Titanium Ethyl Acetoacetate 20% Methyltrimethoxysilane | 3.3 |

| Sample 41 | |
|---|---|
| Speedmixer Component | Amount (g) |
| Polydimethylsiloxane 100% end capped with 66.4% β ethyltrimethoxy tetramethyldisiloxane | 208.04 |
| Precipitated Calcium Carbonate | 126.88 |
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

| Sample 42 | |
|---|---|
| Speedmixer Component | Amount (g) |
| Polydimethylsiloxane 100% end capped with 76.6% β ethyltrimethoxy tetramethyldisiloxane | 208.04 |
| Precipitated Calcium Carbonate | 126.88 |
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

| Sample 43 | |
|---|---|
| Speedmixer Component | Amount (g) |
| Polydimethylsiloxane 100% end capped with 86.8% β ethyltrimethoxy tetramethyldisiloxane | 208.04 |
| Precipitated Calcium Carbonate | 126.88 |

-continued

Sample 43

| Speedmixer Component | Amount (g) |
|---|---|
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

Sample 44

| Speedmixer Component | Amount (g) |
|---|---|
| Polydimethylsiloxane 100% end capped with 96.4% β ethyltrimethoxy tetramethyldisiloxane | 208.04 |
| Precipitated Calcium Carbonate | 126.88 |
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

Sample 45

| Speedmixer Component | Amount (g) |
|---|---|
| Polydimethylsiloxane 100% end capped with 65% β Pr-T EHM | 208.04 |
| Precipitated Calcium Carbonate | 126.88 |
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

Sample 46

| Speedmixer Component | Amount (g) |
|---|---|
| Polydimethylsiloxane 100% end capped with 95% β Pr-T EHM | 208.04 |
| Precipitated Calcium Carbonate | 126.88 |
| Methyltrimethoxysilane | 10.15 |
| Slurry 80% Titanium Ethyl Acetoacetate 20% Methyltrimethoxysilane | 4.66 |
| N-(3-(Trimethoxysilyl)propyl)ethylenediamine | 0.28 |

INDUSTRIAL APPLICABILITY

The examples above show that cobalt catalysts can produce desired product without requiring the use of precious metal hydrosilylation catalysts (such as platinum group metal catalysts), which are expensive.

The examples and comparative examples above show that when a polyorganosiloxane is endblocked with an alkoxy-functional organohydrogensiloxane oligomer prepared by the method described herein and having >90 mol % of linear divalent hydrocarbon linking groups, and the resulting endblocked polyorganosiloxane is formulated into a condensation reaction curable composition, the composition cures faster than a comparative composition containing a polyorganosiloxane endblocked with an alkoxy-functional organohydrogensiloxane oligomer having a lower amount of linear divalent hydrocarbyl linking groups and a higher amount of branched divalent hydrocarbon linking groups.

The invention claimed is:

1. A method for preparing an alkoxy-functional organohydrogensiloxane oligomer, where the method comprises:
1) reacting starting materials comprising:
    (A) a polyorganohydrogensiloxane oligomer of unit formula:

$(HR^1_2SiO_{1/2})_e(R^1_3SiO_{1/2})_f(HR^1SiO_{2/2})_g(R^1_2SiO_{2/2})_h$
    $(R^1SiO_{3/2})_i(HSiO_{3/2})_j(SiO_{4/2})_k$ where subscripts e, f, g, h, i, j, and k have values such that $5≥j≥0$, $5≥f≥0$, $10≥g≥0$, $5≥h≥0$, subscript i is 0 or 1, $5≥j≥0$, subscript k is 0 or 1, with the proviso that a quantity $(e+g+j)≥2$, and a quantity $(e+f+g+h+i+j+k)≤50$; and each $R^1$ is independently a monovalent hydrocarbon group of 1 to 18 carbon atoms or a monovalent halogenated hydrocarbon group of 1 to 18 carbon atoms;
    (B) an aliphatically unsaturated alkoxysilane of formula:

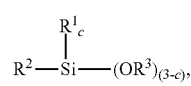

where each $R^2$ is independently an aliphatically unsaturated monovalent hydrocarbon group of 2 to 18 carbon atoms, each $R^3$ is independently a monovalent hydrocarbon group of 1 to 18 carbon atoms, subscript c is 0 or 1; and
    (C) a cobalt complex which comprises a dicobalt hexacarbonyl diphenylphosphinoalkane, thereby preparing a reaction product comprising the alkoxy-functional organohydrogensiloxane oligomer; and
    optionally 2) isolating the alkoxy-functional organohydrogensiloxane oligomer prepared in step 1).

2. The method of claim 1, where (C) the cobalt complex comprises dicobalt hexacarbonyl 1,1-bis(diphenylphosphino)methane.

3. The method of claim 1, where the alkoxy-functional organohydrogensiloxane oligomer has unit formula:

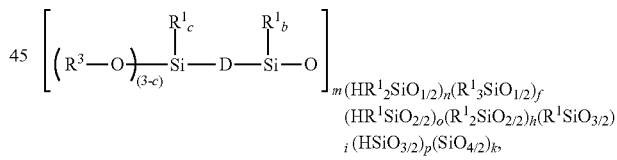

where $R^1$, $R^3$, and subscripts c, f, h, i, and k are as described above, subscript b is 0 to 2, m>0, and a quantity $(m+n+o+p)=(e+g+j)$, and each D is independently a divalent hydrocarbon group of 2 to 18 carbon atoms, with the proviso that >90 mol % of all D groups produced in step 1) are linear.

4. The method of claim 1, where (A) the polyorganohydrogensiloxane oligomer has formula:

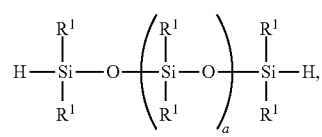

where subscript a is 0 to 10.

5. The method of claim 4, where the alkoxy-functional organohydrogensiloxane oligomer has formula:

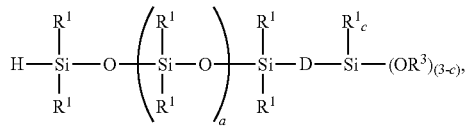

where D is a divalent hydrocarbon group of 2 to 18 carbon atoms, with the proviso that >90 mol % of D are linear divalent hydrocarbon groups.

6. The method of claim 1, where (A) the polyorganohydrogensiloxane oligomer has unit formula:
$(HR^1{}_2SiO_{1/2})_3(R^1{}_2SiO_{2/2})_q(R^1SiO_{3/2})$, where subscript q is 0 to 3.

7. The method of claim 6, where (A) the polyorganohydrogensiloxane oligomer has formula:

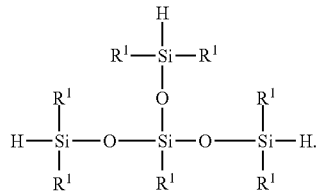

8. The method of claim 7, where alkoxy-functional organohydrogensiloxane oligomer has a formula comprising:

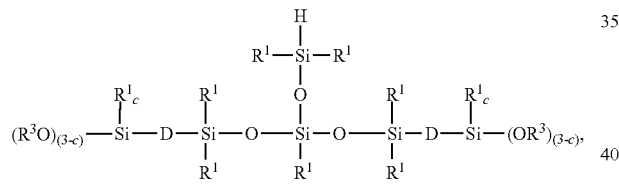

where each D is independently a divalent hydrocarbon group of 2 to 18 carbon atoms, with the proviso that >90 mol % of D are linear divalent hydrocarbon groups.

9. The method of claim 1, where the organohydrogensiloxane oligomer is a cyclic organohydrogensiloxane oligomer of unit formula: $(R^1{}_2SiO_{2/2})_v(R^1HSiO_{2/2})_s$, where subscript $s \geq 3$, and subscript $v \geq 0$.

10. The method of claim 9, where the alkoxy-functional organohydrogensiloxane oligomer has unit formula:

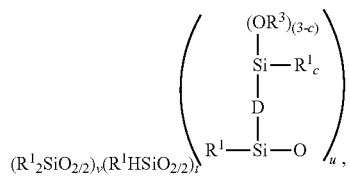

where subscript t 0, subscript u≥1, and a quantity (t+u)=s, each D is independently a divalent hydrocarbon group of 2 to 18 carbon atoms, with the proviso that >90 mol % of all D groups are linear divalent hydrocarbon groups.

11. A method for preparing a poly-alkoxy functional polyorganosiloxane, where the method comprises:

1) reacting starting materials comprising:
   (A) a polyorganohydrogensiloxane oligomer of unit formula:

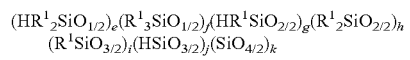

where subscripts e, f, g, h, i, j, and k have values such that 5≥e≥0, 5≥f≥0, 10≥g≥0, 5≥h≥0, subscript i is 0 or 1, 5≥j≥0, subscript k is 0 or 1, with the proviso that a quantity (e+g+j)≥2, and a quantity (e+f+g+h+i+j+k)≤50; and each $R^1$ is independently a monovalent hydrocarbon group of 1 to 18 carbon atoms or a monovalent halogenated hydrocarbon group of 1 to 18 carbon atoms;

(B) an aliphatically unsaturated alkoxysilane of formula:

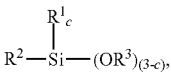

where each $R^2$ is independently an aliphatically unsaturated monovalent hydrocarbon group of 2 to 18 carbon atoms, each $R^3$ is independently a monovalent hydrocarbon group of 1 to 18 carbon atoms, subscript c is 0 or 1; and (C) a cobalt complex which comprises a dicobalt hexacarbonyl diphenylphosphinoalkane, thereby preparing a reaction product comprising an alkoxy-functional organohydrogensiloxane oligomer; and optionally 2) isolating the alkoxy-functional organohydrogensiloxane oligomer prepared in step 1);

2) reacting starting materials comprising:
   (a) the alkoxy-functional organohydrogensiloxane oligomer;
   (b) a polyorganosiloxane having, per molecule, an average of at least two aliphatically unsaturated monovalent hydrocarbon groups; and
   (c) a hydrosilylation reaction catalyst.

12. The method of claim 11, where starting material (b) is a polydiorganosiloxane of formula:

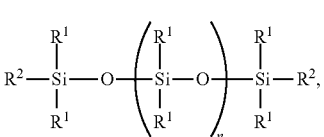

where each $R^1$ is independently a monovalent hydrocarbon group of 1 to 18 carbon atoms or a monovalent halogenated hydrocarbon group of 1 to 18 carbon atoms, each $R^2$ is independently an aliphatically unsaturated monovalent hydrocarbon group of 2 to 18 carbon atoms, and subscript n is 1 to 2,000.

13. The method of claim 11, where the poly-alkoxy functional polyorganosiloxane has formula:

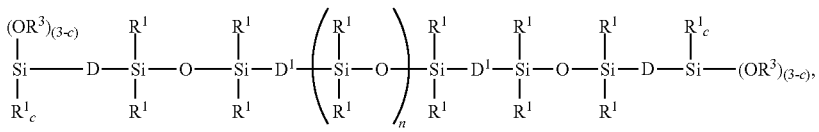

where each $R^3$ is independently a monovalent hydrocarbon group of 1 to 18 carbon atoms, subscript c is 0 or 1; each $R^1$ is independently a monovalent hydrocarbon group of 1 to 18 carbon atoms or a monovalent halogenated hydrocarbon group of 1 to 18 carbon atoms, each $D^1$ is independently a divalent hydrocarbon group, each D is independently a divalent hydrocarbon group of 2 to 18 carbon atoms, with the proviso that >90 mol % of all D groups are linear divalent hydrocarbon groups; and subscript n is 1 to 2,000.

14. A method for making a condensation reaction curable composition comprising:
1) reacting starting materials comprising:
(A) a polyorganohydrogensiloxane oligomer of unit formula:

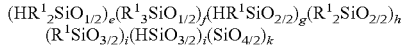

where subscripts e, f, g, h, i, j, and k have values such that 5≥e≥0, 5≥f≥0, 10≥g≥0, 5≥h≥0, subscript i is 0 or 1, 5≥j≥0, subscript k is 0 or 1, with the proviso that a quantity (e+g+j)≥2, and a quantity (e+f+g+h+i+j+k)≤50; and each $R^1$ is independently a monovalent hydrocarbon group of 1 to 18 carbon atoms or a monovalent halogenated hydrocarbon group of 1 to 18 carbon atoms;
(B) an aliphatically unsaturated alkoxysilane of formula:

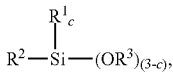

where each $R^2$ is independently an aliphatically unsaturated monovalent hydrocarbon group of 2 to 18 carbon atoms, each $R^3$ is independently a monovalent hydrocarbon group of 1 to 18 carbon atoms, subscript c is 0 or 1; and (C) a cobalt complex which comprises a dicobalt hexacarbonyl diphenylphosphinoalkane, thereby preparing a reaction product comprising an alkoxy-functional organohydrogensiloxane oligomer; and
optionally 2) isolating the alkoxy-functional organohydrogensiloxane oligomer prepared in step 1);
2) reacting starting materials comprising:
(a) the alkoxy-functional organohydrogensiloxane oligomer;
(b) a polyorganosiloxane having, per molecule, an average of at least two aliphatically unsaturated monovalent hydrocarbon groups; and
(c) a hydrosilylation reaction catalyst; thereby preparing a poly-alkoxy functional polyorganosiloxane; and
3) mixing starting materials comprising
(i) the poly-alkoxy functional polyorganosiloxane, and
(ii) a condensation reaction catalyst.

15. The method of claim 14, where the condensation reaction catalyst comprises a titanate catalyst.

16. The method of claim 14, where the composition further comprises one or more additional starting materials, where the one or more additional starting materials are selected from the group consisting of (iii) a filler; (iv) a filler treating (v) a crosslinker; (vi) an adhesion promoter, (vii) a drying agent; (viii) an extender, a plasticizer, or a combination thereof; (ix) a biocide; (x) a flame retardant; (xi) a chain lengthener; (xii) an endblocker; (xiii) a nonreactive binder; (xiv) an anti-aging additive; (xv) a water release agent; (xvi) a pigment; (xvii) a rheological additive; (xviii) a vehicle; (xix) a tackifying agent; (xx) a corrosion inhibitor; and a combination of two or more of (iii), (iv), (v), (vi), (vii), (viii), (ix), (x), (xi), (xii), (xiii), (xiv), (xv), (xvi), (xvii), (xviii), (xix), and (xx).

17. The method of claim 14, where the poly-alkoxy functional polyorganosiloxane has formula:

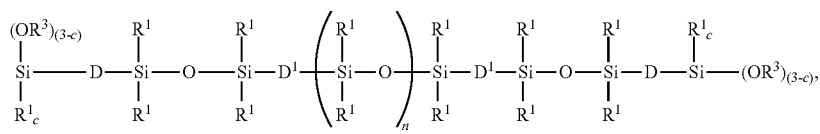

where each $R^3$ is independently a monovalent hydrocarbon group of 1 to 18 carbon atoms, subscript c is 0 or 1; each $R^1$ is independently a monovalent hydrocarbon group of 1 to 18 carbon atoms or a monovalent halogenated hydrocarbon group of 1 to 18 carbon atoms, each $D^1$ is independently a divalent hydrocarbon group, each D is independently a divalent hydrocarbon group of 2 to 18 carbon atoms, with the proviso that >90 mol % of all D groups are linear divalent hydrocarbon groups; and subscript n is 1 to 2,000.

* * * * *